United States Patent

Reinecke

[15] 3,659,728
[45] May 2, 1972

[54] APPARATUS FOR COLLECTING AND PILING OF DISC-SHAPED OBJECTS

[72] Inventor: Gunter Reinecke, Wuppertal-Elberfeld, Germany

[73] Assignee: Benz & Hilgers GmbH, Dusseldorf, Germany

[22] Filed: Nov. 20, 1970

[21] Appl. No.: 91,246

[30] Foreign Application Priority Data

Nov. 29, 1969 Germany.....................P 19 60 118.4

[52] U.S. Cl. ..............................214/6 H, 93/93 DP, 271/88
[51] Int. Cl.........................................................B65g 57/03
[58] Field of Search.................214/6 D, 6 H, 6 DK, 6 P, 6 M, 214/6 N, 6 A; 271/88, 68; 93/93 DP

[56] References Cited

UNITED STATES PATENTS

| | | | |
|---|---|---|---|
| 2,579,541 | 12/1951 | Bobst | 214/6 H UX |
| 2,956,381 | 10/1960 | Chauvin et al. | 214/6 H X |
| 3,233,891 | 2/1966 | Denton et al. | 271/88 X |
| 3,557,972 | 1/1971 | Banks | 214/6 DK |

Primary Examiner—Gerald M. Forlenza
Assistant Examiner—Robert J. Spar
Attorney—Ernest G. Montague

[57] ABSTRACT

An apparatus for collecting and piling of disc-shaped objects, as sausage slices and cheese slices, chocolate bars, baking goods and the like comprising a conveyor device, and a collecting plate and a runway slide. The conveyor device feeds objects to the collecting plate by means of a run slide, means for stepwise lowering the collecting plate are provided in dependency upon the cutting thickness of the objects. A stripping device removing the piled objects, and a receiving plate is arranged for receiving the objects from the collecting plate. The collecting plate, the stripping device and the receiving plate the latter capable of being lifted and lowered, are connected with cam controlled driving units disposed independently from each other. Locking discs capable of being driven by a joint switching drive and alternately moving, are coordinated to the driving units, and the locking discs make possible a freeing of the driving units for lifting the collecting plate and receiving plate and operation of the stripping device only upon termination of a predetermined number of switching steps identical with the number of disc shaped objects of a disc package.

7 Claims, 8 Drawing Figures

INVENTOR
Günter Reinecks
BY

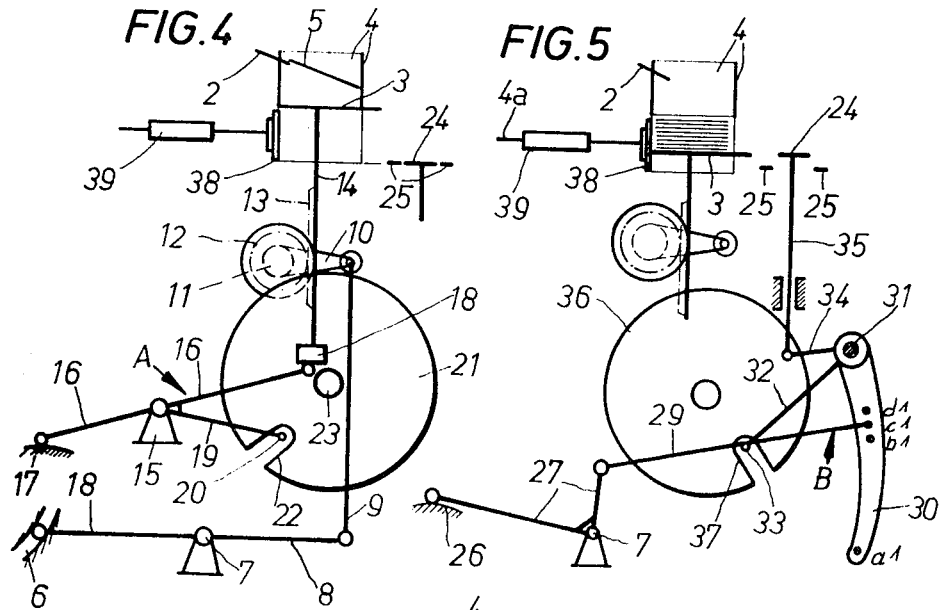

APPARATUS FOR COLLECTING AND PILING OF DISC-SHAPED OBJECTS

The present invention relates to an apparatus for collecting and piling of disc-shaped objects, as sausage-and cheese-slices, chocolate bars, baked goods and the like, in general, and to such apparatus comprising a feeding device, by means of which the objects are fed to a collecting plate by means of a runway, which collecting plate in turn is stepwise lowered for the production of a constant deposit plane in dependency on the cutting width of the objects, whereby the piled objects are fed to a conveyor band by means of a stripping device.

The known collection-and piling-devices for flat objects start as a rule at a single piling height. In order that the objects find always an unvarying deposit plane, which is any way unavoidable in case of a horizontal feed, the collecting plate is lowered stepwise about the disc width. Upon reaching a predetermined piling level, the collecting plate, the stripping device and the conveyor band receiving the piled objects are disposed in a horizontal plate, so that merely a movement of the stripping device is required, in order to transfer the pile onto the conveyor band. Instead of the conveyor band, as is known, a device putting the objects in board can find its application, which points the opened carton or the folding box towards the collecting plate, so that the piled objects are moved into the collecting packing with the movement of the stripping device.

A known piling device makes possible the collection and piling of flat objects in two different piling levels. The collecting plate is thereby lifted at first up to the deposit plane and then lowered stepwise to the predetermined piling level, whereupon also the collecting plate is lowered into the plane of the stripping device and of the conveyor band. Only upon removal of the pile can the collecting plate be lifted again.

Aside from the fact that the collecting plate is thereby equipped with totally three movements, which require already expensive and cumbersome construction measures, these measures become then more complicated, since the possibility for another piling level is then provided additionally. There is also in addition the fact that the piling output is thereby subjected to an insufficient exploitation, since the transportation of the piled objects onto the conveyor band is possible only after the collecting plate has assumed its lowermost position.

It is, therefore, one object of the present invention to provide an apparatus for collecting and piling of disc-shaped objects, which makes possible, while avoiding the above stated drawbacks, an output increase by reduction of the movement succession and a fast transportation possibility to different piling levels.

It is another object of the present invention to provide an apparatus for collecting and piling of disc-shaped objects, wherein the collecting plate, the stripping device and a receiving plate capable of being lifted and lowered are connected with cam-controlled driving members disposed independently from each other, to which driving members are coordinated an intermittently turning locking disc capable of being driven by a joint switching device, which locking disc reaches a position, upon run of a predetermined number of switching steps, identical with the number of the discs of a disc-package, in which position the driving members are free for lifting of the collecting-and receiving-plate and for the operation of the stripping device.

It is still another object of the present invention, to provide an apparatus for collecting and piling of disc-shaped objects, wherein the coordination of the receiving plate capable of being lifted and lowered makes possible the saving of a third movement of the collecting plate, whereby the latter is stepwise lowered from its upper starting position to reaching of the desired package level and is then lifted again. In addition it is to be stated, that within a predetermined range disc packages with a different number of discs can be formed, whereby the transposition from one package level to another with a few manual manipulations. For the performance of these measures it does not matter, whether the disc-shaped objects are wrapped individually in paper or in a foil of synthetic material or not at all.

With these and other objects in view, which will become apparent in the following detailed description, the present invention, which is shown by example only, will be clearly understood in connection with the accompanying drawings, in which:

FIGS. 4, 5, 6 and 6a are schematic views of the driving members in different operational positions; and FIG. 7 is a perspective view of the collecting-and piling-apparatus of the present invention.

Figure 1:
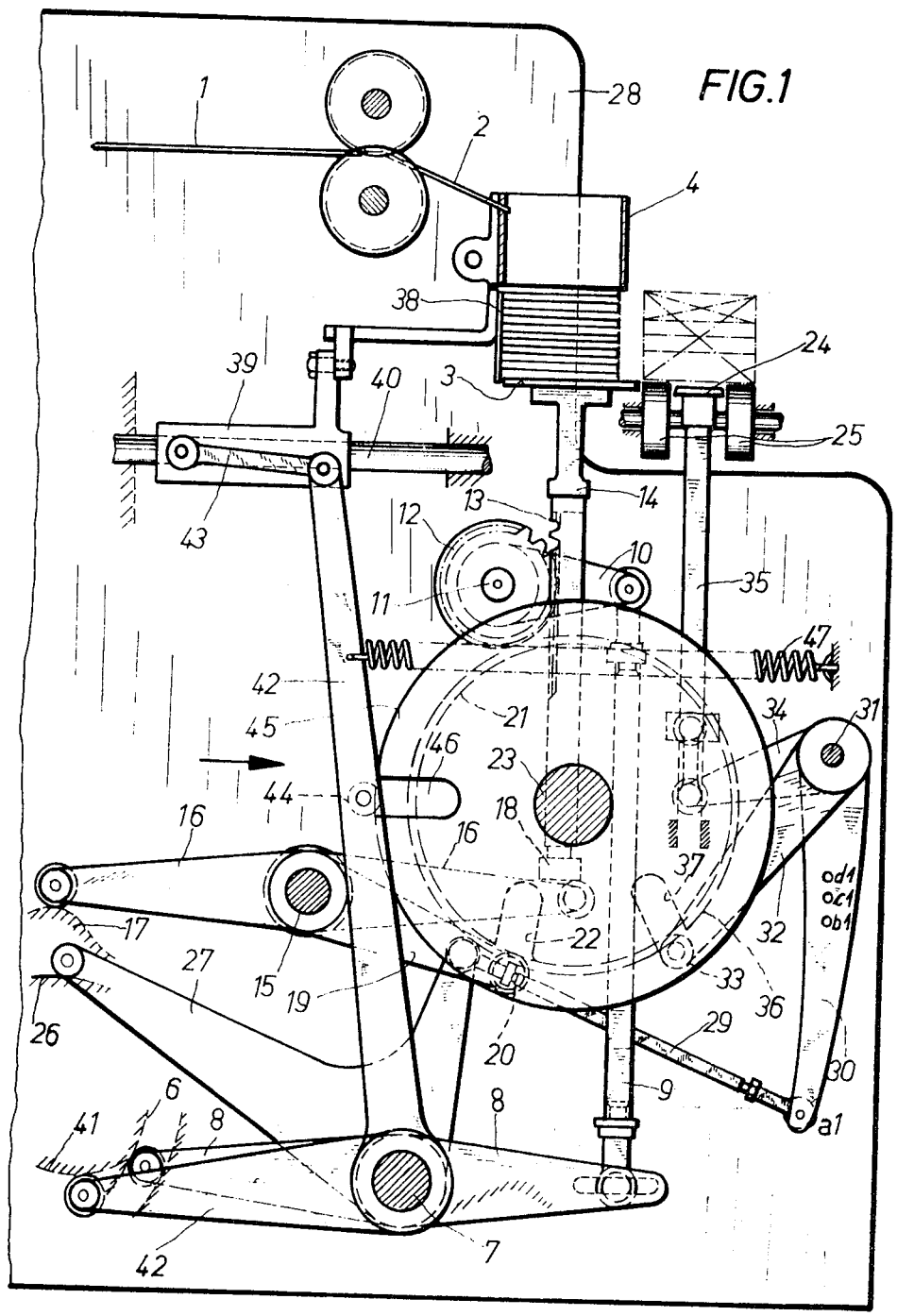
FIG. 1 is a side elevation of an apparatus for collecting and piling of disc-shaped objects, shown partly in section along the lines 1—1 of FIG. 2.
Figure 2:
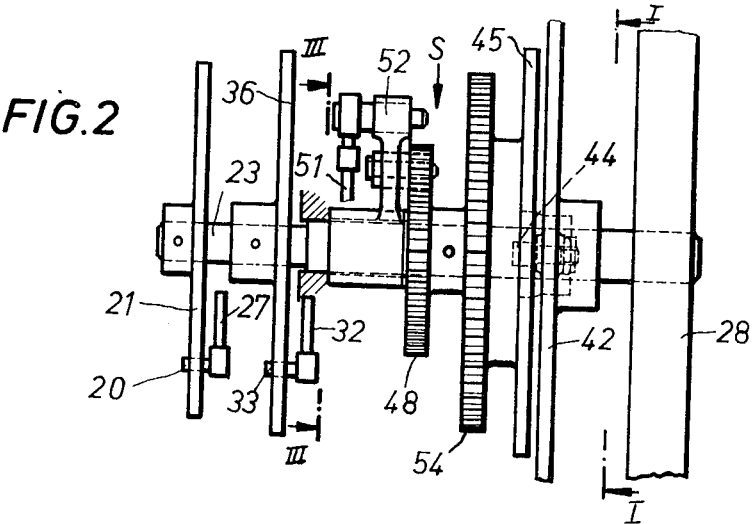
FIG. 2 is a fragmentary elevation of the apparatus shown in FIG. 1 seen in the direction of the arrow A of FIG. 1.

Referring now to the drawings, and in particular to the embodiment of FIG. 7, eight disc-shaped objects, by example, cheese slices 5, individually wrapped in foils of synthetic material disposed adjacent each other, are simultaneously fed to a collecting plate 3 by means of a conveyor band 1 and a rum-slide 2. The collecting plate 3 is edged all around by walls, of which a narrow longitudinal wall 4 serves as a bumper face for the disc 5 arriving from the run-slide 2.

The uppermost position of the collecting plate 3 is its starting position, from which it is stepwise lowered, until it has reached its lower position dependent upon the package height. Each step is adjusted to the thickness of the disc 5, so that a constant deposit plane is maintained from the first to the last disc 5. This is particularly important then, when the disc is not fed by means of a run-slide 2, rather at the level of the deposit plane of the collecting plate 3. The stepwise downward movement is controlled by a cam curve 6 (FIG. 1) by means of engagement of one end of a lever 8 mounted on a pivot 7, on the other end of the lever 8 being pivoted a connecting rod 9, which in turn transmits its short-stroke downward movements to a swinging lever 10 secured to a pinion-shaft 11. A pinion 12 on the pinion-shaft 11 and equipped with an overrunning clutch engages a gear rack 13, which is an ingredient of a guide rod 14 carrying the collecting plate 3. The overrunning clutch on the pinion-shaft 11 assures only a joinder of the gear rack 13 downwardly, while it leaves free the position of the gear rack 13 during lifting of the connecting rod 9.

The upward movement of the collecting plate 3 takes place by means of a cam-controlled driving unit A(FIG. 4), consisting of a lever 16 mounted on a pivot 15, one end of the lever 16 being controlled by an open cam curve 17 and the other end of the lever 16 engaging a rail 18 secured to the lower end of the guide rod 14. A lever arm 19, disposed at a predetermined angle to the lever 16, sets on the bearing for pivot 15, and carries at its free end a control bolt 20. The latter operates jointly with a locking disc 21, which is rigidly secured to a driving shaft 23 and is equipped with a radial groove 22. In FIG. 1, the locking disc 21 has reached one revolution and stands with its radial groove 22 directly opposite the control bolt 20. In accordance with FIG. 4, the control bolt 20 controlled by the cam-curve 17 has entered into the radial groove 22, whereby the rail 18 and the guide rod 14 and thereby the collecting plate 3 is lifted into their upper starting position by means of the lever 16. This upward movement is thus possible only upon termination of one revolution of the locking device 21.

In addition to the movement of the connecting plate 3, a movement of the receiving plate 24 is provided, which receiving plate 24 in the shown embodiment, is disposed in its lowermost position between two conveyor belts 25. The receiving plate 24 is controlled by a cam-curve 26 by means of the driving unit B, whereby the cam movement is transmitted to a setting lever 30 by means of an angular lever 27 mounted on a pivot 7 and a connecting lever 29, which setting lever 30 is in turn equipped with several plug-bores a', b', c' and d' for selective securing of the free end of the connecting lever 29. In addition to the setting lever 30, two lever arms 32 and 34 are mounted on a shaft 31, of which lever arms, the lever arms 32 carries at its end a control bolt 33 and the lever arm 34 is pivoted to a carrying rod 35 receiving the receiving plate 24.

The control bolt 33 operates likewise with a radial groove 37 provided in the locking device 36 such, that upon entering the control bolt 33 into the radial groove 37, the driving unit B is freed and the receiving plate 24 performs an upward movement of predetermined height depending upon the position of the connecting lever 29.

A stripping device 38 sits sunk in the longitudinal wall 4 below the run-slide 2, which stripping device is guided horizontally displaceable by means of a slide 39 on a slide rail 40.

A driving unit C is pivoted to the slide 39, which consists of an angular lever 42, mounted on the pivot 7 and controlled by an open cam-curve 41, and a lever arm 43 pivoted to the slide 39. At about the center of the long arm, the angular lever 42 has a control bolt 44, which enters a radial unit 46 provided in the locking disc 45 in its proper position and thereby frees the driving unit C for advancement of the stripping device 38. The control bolt 44 comes into engagement always forcibly by means of a pull spring 47 against the periphery of the locking disc 45. In addition to the locking discs 21, 36 and 45 sitting rigidly on the driving shaft 23, which is mounted in the housing wall 28, sits a switching drive S on the driving shaft 23, which switching drive S puts into operation the mentioned locking discs. For reasons of a better showing, the switching drive is not shown in FIGS. 1 and 4–6. The switching drive consists, among others, of a counting disc 48 equipped with totally 48 teeth and a lifting lever 50 mounted at a pivot 7 and controlled by means of a closed cam-curve 49, which lifting lever 50 effects a ratchet 53 by means of a connecting rod 51 and a ratchet lever 52 sitting loosely on the driving shaft 23, the ratchet 53 being secured to the ratchet lever 52, such that the ratchet 53 provides a switching movement by engagement with the counting disc 48, which switching movement is dependent upon the extent of movement of the lifting lever 50. The latter is equipped with plug-bores a, b, c and d. In order to fix the switching step caused by the switching movement, a tooth disc 54 is coordinated to the counting disc 48, in the teeth of which tooth disc 54 enters a bolt 55 of a bolt lever 56 mounted on the pivot 50. The switching movement of the ratchet 53 is adjusted to the switching movement of the bolt lever 56 derived from a cam-curve 57 such, that a return movement of the counting disc 48 and of the locking discs 21, 36 and 45, sitting likewise on the same shaft 23, is avoided. The toothed disc 54 is equipped as the counting disc 48 with 48 teeth.

Figure 3:
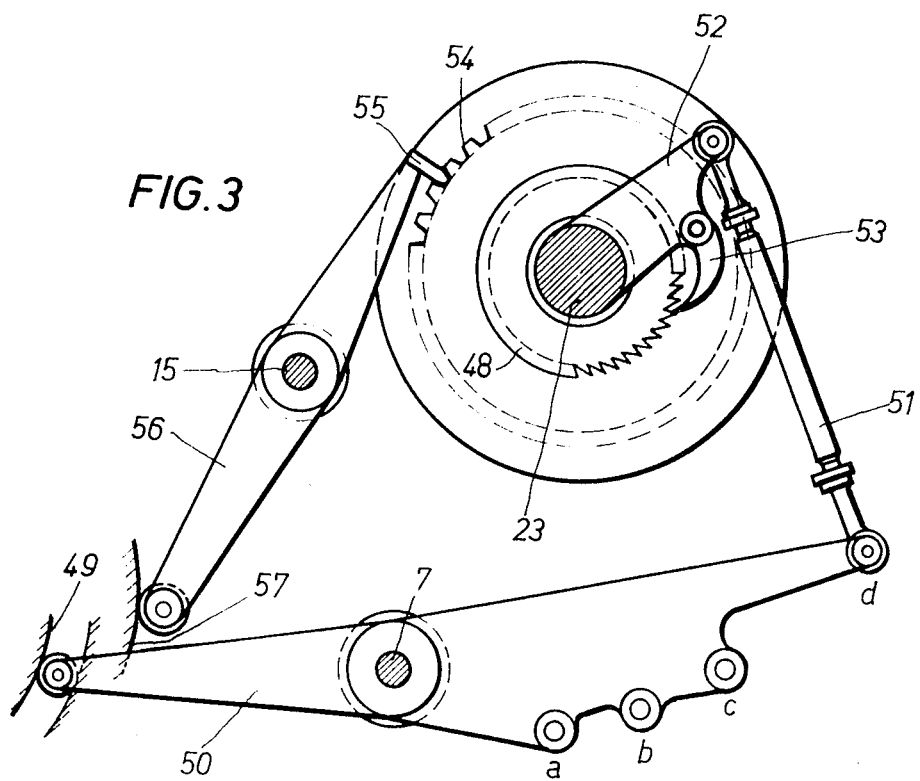
FIG. 3 is a fragmentary side elevation of the apparatus shown partly in section along the lines 3—3 of FIG. 2.

The setting of the switching drive S for the production of a disc package with a predetermined number of discs occurs as follows:

The collecting plate 3, as has been set forth, is lifted after a single revolution of the locking disc 21. If the collecting plate 3, as is shown in FIG. 1, receives 24 discs 5, the locking disc 21 must perform 24 switching steps during one revolution. This means, that the counting disc 48 is advanced during each switching step for two teeth. In this case, merely the total number of 48 teeth is divided by the number of 24 discs 5. The connecting rod 51 must be inserted for this purpose into the plug-bore a. By this arrangement the smallest possible lifting movement results for the lifting lever 50, which lifting movement exerts itself by means of the ratchet 53 into a switching step of two teeth for the counting disc 48. If disc packages of 16 discs 5 are to be obtained, it is required to shift the connecting rod 51 into the plug-bore b. With this lift a switching step of three teeth is obtained on the counting disc 48. Upon shifting into a plug-bore c, with a tooth advance of four teeth, the disc package becomes only 12 discs 5 high, while in the position d, shown in FIG. 3, the largest switching step with six teeth can be obtained, in which, however, only one disc package with eight discs 5 is created.

In order that the receiving plate 24 can adjust itself to the different level positions of the collecting plate 3, the setting lever 30 has likewise totally for plug-bore a', b', c' and d', which correspond with the values of the plug-bores a–d on the lifting lever 50. The individual movement during the production of a 12-disc package can be recognized in FIGS. 4, 5, 6 and 6a, whereby at first in accordance with FIG. 4 the collecting plate 3 is lifted up to its upper starting position. Since in accordance with FIG. 5 the disc package is full-numbered, the receiving plate 24 lifts itself up to the level of the collecting plate 3, whereupon by means of the stripping device 38 passing between the divided collecting plate 3, which stripping device 38 consists likewise of many individual plates, the adjacent disposed disc package is transferred from the collecting plate 3 to the receiving plate 24 and then is lowered onto the conveyor bands 25. The stripping device 38 is dimensioned and disposed such, that it grips independent from the level from the disc package and is capable to remove the same.

Instead of eight adjacent disposed collecting plates, the device can be provided also for the formation of a single disc package.

While I have disclosed several embodiments of the present invention, it is to be understood that these embodiments are given by example only and not in a limiting sense.

I claim:

1. An apparatus for collecting and piling of disc-shaped objects, as sausage slices and cheese slices, chocolate bars, baking goods and the like comprising
   a conveyor device,
   a collecting plate and a runway slide,
   said conveyor device feeding objects to said collecting plate by means of a run slide,
   means for stepwise lowering said collecting plate in dependency upon the cutting thickness of said objects,
   a stripping device removing said piled objects,
   a receiving plate for receiving said objects from said collecting plate,
   said collecting plate, said stripping device, and said receiving plate, the latter capable of being lifted and lowered, being connected with cam-controlled driving units disposed independently from each other,
   locking discs capable of being driven by a joint switching drive and alternately moving, being coordinated to said driving units, and or
   said locking discs making possible a freeing of said driving units for lifting said collecting plate and receiving plate and operation of said stripping device only upon termination of a predetermined number o switching steps identical with the number of disc-shaped objects of a disc package.

2. The apparatus, as set forth in claim 1, wherein,
   said switching drive contacts, each of said locking discs such, that only upon termination of a total revolution said locking discs are disposed with their radial grooves opposite a contact bolt of said driving units, and upon entering of said control bolt in said radial groove a lifting of said plates and operation of said stripping device is released.

3. The apparatus, as set forth in claim 1, wherein said switching drive comprising a counting disc and a toothed disc,
   said locking discs as well as said counting disc and toothed disc are disposed on a joint driving shaft
   said counting disc being rotatable by a cam-controlled ratchet about a number of teeth divisionable by the total number of teeth, and
   said toothed disc equipped with the same total number of teeth as said counting disc joining the rotary movement by arrangement of a movement control bolt, said switching step of the counting disc being fixed.

4. The apparatus, as set forth in claim 3, which includes
   a ratchet lever sitting freely rotatable on same driving shaft,
   said ratchet is disposed on said ratchet lever,
   a connecting rod and a double-armed lifting lever,
   said ratchet lever is connected with a double-armed lifting lever by means of said connecting rod, and the free end of said lifting lever carries a roller controlled by a closed cam-curve.

5. The apparatus, as set forth in claim 4, wherein
said lifting lever has a plurality of plug bores for the lifting adjustment of said connecting rod and
said counting disc and said toothed disc are rotatable about a number of teeth divisionable by the total number of teeth.

6. The apparatus, as set forth in claim 1, wherein
said driving unit coordinated to the height adjustment of said receiving plate comprises immovably mounted lever arms, a setting lever, a connecting rod and a cam controlled angular lever,
one of the lever arms being connected with said receiving plate by means of a connecting rod,
said lever arms carrying a control bolt engaging the radial groove of said locking disc, and
said setting lever has a plurality of plug bores for a level adjustment of said connecting rod and thereby of said receiving plate.

7. The apparatus, as set forth in claim 1, which includes
means for stepwise lowering of said collecting plate, in order to obtain a constant receiving plate for said discs,
said connecting rod carrying said collecting plate is formed partly as a gear rack,
a pinion equipped with a running clutch immovably mounted and engaging said gear rack, and
said pinion is rotatably mounted on a switching lever secured to the shaft of the pinion.

* * * * *